(12) United States Patent
Kvist et al.

(10) Patent No.: US 8,267,480 B2
(45) Date of Patent: Sep. 18, 2012

(54) METHOD AND A DEVICE FOR CONTROLLING A VEHICLE COMPRISING A DUMP BODY

(75) Inventors: Roland Kvist, Braas (SE); Marcus Miller, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 48 days.

(21) Appl. No.: 12/667,044

(22) PCT Filed: Dec. 21, 2007

(86) PCT No.: PCT/SE2007/001164
§ 371 (c)(1),
(2), (4) Date: Dec. 29, 2009

(87) PCT Pub. No.: WO2009/008785
PCT Pub. Date: Jan. 15, 2009

(65) Prior Publication Data
US 2010/0327649 A1   Dec. 30, 2010

(30) Foreign Application Priority Data
Jul. 11, 2007   (SE) ....................... 0701726

(51) Int. Cl.
*B60P 1/28*   (2006.01)
(52) U.S. Cl. ................................... 298/19 R
(58) Field of Classification Search ............ 298/17 R, 298/19 R, 22 R, 22 C, 22 P
See application file for complete search history.

(56) References Cited

U.S. PATENT DOCUMENTS

| | | | |
|---|---|---|---|
| 4,614,477 A | 9/1986 | Hagnbuch | |
| 4,630,227 A | 12/1986 | Kagenbuch | |
| 5,637,837 A * | 6/1997 | Merz et al. | 177/145 |
| 5,664,933 A | 9/1997 | Scherer et al. | |
| 5,742,228 A | 4/1998 | Levy | |
| 6,783,187 B2 * | 8/2004 | Parsons | 298/22 R |
| 2004/0080206 A1* | 4/2004 | Parsons | 298/22 R |
| 2005/0028604 A1 | 2/2005 | Saigh et al. | |
| 2011/0198911 A1* | 8/2011 | Bielfelt | 298/27 |

FOREIGN PATENT DOCUMENTS

| | | | |
|---|---|---|---|
| JP | 58152635 A * | 9/1983 | |
| JP | 59096022 A | 6/1984 | |
| JP | 10096663 A | 4/1998 | |
| WO | 0194147 A1 | 6/2001 | |
| WO | 2006093438 A1 | 9/2006 | |

OTHER PUBLICATIONS

International Search Report for corresponding International Application PCT/SE2007/001164.
Supplementary European Search Report for corresponding European App. EP 07 85 2156.

* cited by examiner

*Primary Examiner* — H Gutman
(74) *Attorney, Agent, or Firm* — WRB-IP LLP

(57) ABSTRACT

A method for controlling a vehicle including a dump body includes automatically monitoring the contents of the dump body during an elevating motion, determining when the dump body has reached a predefined condition during the elevating motion, and controlling the vehicle when it is determined that the dump body has reached the predefined condition.

20 Claims, 3 Drawing Sheets

METHOD AND A DEVICE FOR CONTROLLING A VEHICLE COMPRISING A DUMP BODY

BACKGROUND AND SUMMARY

The present invention relates to a method for controlling a vehicle comprising a dump body. The invention also relates to a device for controlling a vehicle comprising a dump body. Further, the invention relates to different types of vehicles having a tiltable dump body, such as a dump truck or an articulated hauler. In connection with transportation of heavy loads, e.g. in contracting work, a work machine of the type of an articulated hauler is frequently used. Such vehicles may be operated with large and heavy loads in areas where there are no roads, for example for transports in connection with road or tunnel building, sand pits, mines and similar environments.

An articulated hauler comprises a hydraulic system for moving the tiltable dump body between a lowered position and a raised position. The dump body is connected to the vehicle frame via a hinge at the rear of the vehicle and two hydraulic cylinders are arranged between the frame and the dump body for tilting the dump body.

Conventionally, an operator of the vehicle controls the tilting procedure by operating a control element, such as a tilt lever. During a tilting operation, the dump body is raised to its extreme limit (fully raised position) and then returned to its home position (fully lowered position).

An articulated hauler is often used in a repeated work cycle. The term "work cycle" comprises a route of the work machine (ie the work cycle travel path) and tilting of the dump body. The work cycle is repeated in the same geographical area. According to a work cycle example, an articulated hauler is loaded at a first position, driven along a varied route, unloaded at a second position and driven back along the varied route. Normally, an excavator or wheel loader loads the container of the dump truck at the first position. The articulated hauler is unloaded by means of tilting the dump body.

EP 1 286 850 B1 discloses a semi-automatic system for facilitating operation of an articulated hauler during a tilting procedure. According to this system, a brake is automatically activated and the gearbox is automatically controlled to a neutral position when the operator pushes a tilting activation button.

It is desirable to achieve a method which creates conditions for increasing productivity by shortening a work cycle time.

A method according to an aspect of the present invention includes the steps of monitoring the contents of the dump body during an elevating motion, determining when the dump body has reached a predefined condition during the elevating motion, and controlling the vehicle when it is determined that the dump body has reached the predefined condition.

The terms "monitoring the dump body during an elevating motion" refers to monitoring the extent of contents in the dump body either directly or indirectly.

According to a preferred embodiment, the predefined condition is defined as an empty state. The term "empty state" represents a condition where substantially all material/soil has left the interior of the dump body. Thus, the elevating motion may be interrupted as soon as the dump body is emptied. Since the dump body in many cases is emptied at a tilting angle substantially smaller than the maximum tilting angle, the total tilting cycle time is substantially shortened.

According to an alternative embodiment, the predefined condition is defined as the point in time when the material in the dump body starts to slide out of the dump body. This embodiment may be advantageous when operating material which easily slides once it is in motion. An example of such material is gravel. Thus, the elevating motion may be stopped as soon as the material is in motion and maintained in that position until all material has left the dump body.

The method creates conditions for increasing both productivity and safety due to the facilitated operation. This advantage is especially pronounced for unexperienced operators.

Further, the terms "controlling the vehicle" refers to any control, such as controlling the operation/movement of the dump body and/or other vehicle systems, such as a powertrain for propelling the vehicle. Preferably, the dumping procedure is controlled. For example, the powertrain may be operated for propelling the vehicle in such a manner that the material is dumped in a controlled way over a certain distance, preferably in an even layer, on the ground. Preferably, the vehicle is forwarded with a certain speed. Further, the operation/movement of the dump body and the powertrain may be operated simultaneously.

According to a preferred embodiment, the method comprises the step of lowering the dump body when it is determined that the dump body has reached the empty state. By automatically lowering the dump body immediately after it has been emptied, the total tilting cycle time is further shortened.

Preferably, the method comprises the step of monitoring a load receiving part of the dump body during the elevating motion and determining whether the dump body is empty on the basis of the detection. Thus, an interior of the dump body is monitored in order to determine when the dump body is emptied.

According to a further preferred embodiment, the method comprises the step of detecting a pressure in a hydraulic cylinder adapted to operate the dump body and determining whether the dump body has reached the predefined condition on the basis of the pressure detection. Preferably, the method comprises the step of establishing said predefined condition when a certain pressure change is detected. The pressure change is preferably predefined and is set to indicate the predefined condition.

It is desirable to achieve a device which creates conditions for increasing productivity by shortening a work cycle time.

A device according to an aspect of the present invention comprises means for automatically monitoring the contents of the dump body during an elevating motion, and means adapted to determine when the dump body has reached a predefined condition during the elevating motion and control the vehicle when it is determined that the dump body has reached the predefined condition. Other advantageous features and functions of various embodiments of the invention are set

BRIEF DESCRIPTION OF THE DRAWINGS

The invention will be explained below, with reference to the embodiments shown on the appended drawings, wherein The invention will be explained below, with reference to the embodiments shown on the appended drawings, wherein.

DETAILED DESCRIPTION

Figure 1:
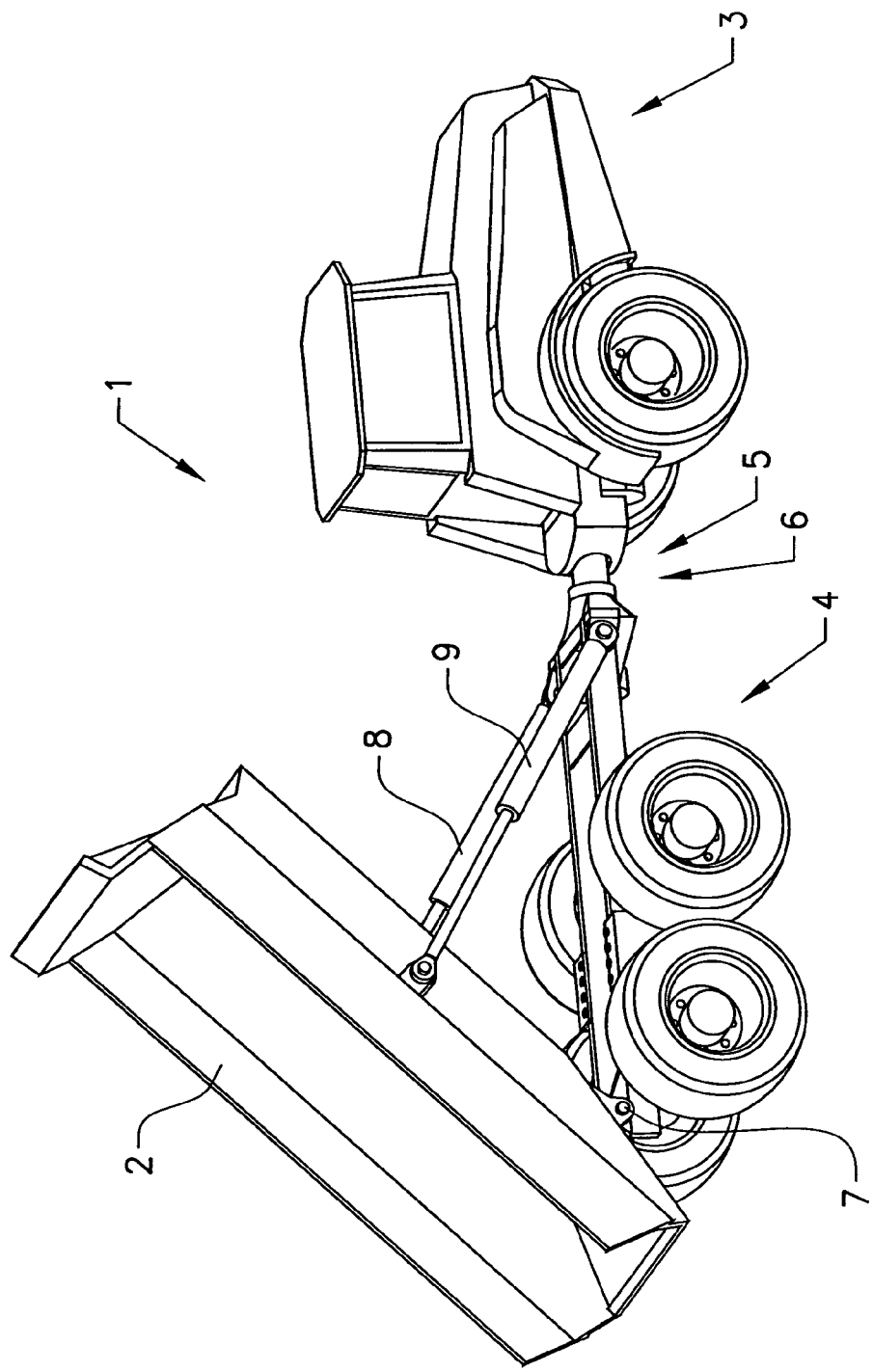
FIG. 1 shows an articulated hauler with a raised dump body in a perspective view.

FIG. 1 shows a dump vehicle in the form of an articulated hauler 1 with a raised dump body 2 in a perspective view. The articulated hauler 1 comprises a front vehicle section 3 comprising a front frame, a front axle and a cab for a driver. The articulated hauler 1 also comprises a rear vehicle section 4 comprising a rear frame, two axles and the tiltable dump body, or container, 2.

The front frame is connected to the rear frame via a first pivot joint 5 that allows them to be pivoted relative to each other around a vertical axis for steering (turning) the vehicle. A pair of hydraulic cylinders (not shown) is arranged one on each side of the pivot joint for steeling the vehicle. The hydraulic cylinders are controlled by the vehicle's driver via a steering wheel and/or a joystick (not shown).

A second pivot joint 6 is arranged to allow the front frame and the rear frame to pivot in relation to each other around an imaginary longitudinal axis, that is an axis that runs in the longitudinal direction of the vehicle.

The tiltable dump body 2 is connected to the rear frame via a pivot joint 7, at a rear part of the rear frame. A pair of hydraulically operated tilting cylinders 8,9 is connected at a first end to the rear frame and at a second end to the dump body 2. The tilting cylinders 8,9 are positioned one on each side of the central axis of the vehicle in its longitudinal direction. The dump body 2 is thus tilted up in relation to the rear frame upon activation of the tilting cylinders 8,9.

The dump body 2 typically is in the form of a box with a closed bottom, side walls, a front wall and an open top. During dumping the contents slide out of the box onto the ground or into a waiting receptacle.

Figure 2:
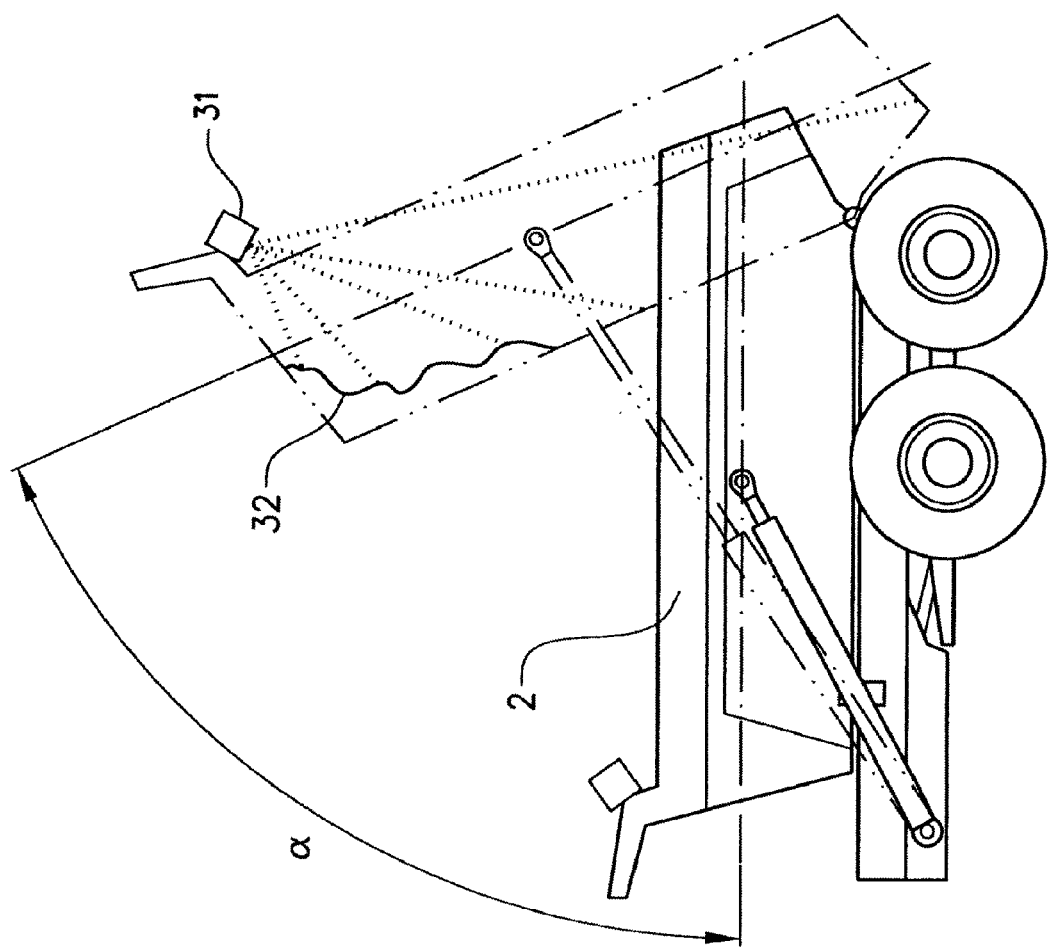
FIG. 2 shows the dump body in its two extreme positions in a side view.

The dump body 5 is shown in two extreme positions in FIG. 2: a fully lowered position and a fully raised position (see dotted lines). The fully raised position corresponds to a maximum tilting angle α. A means 31 for monitoring an interior of the dump body 2 is arranged on the dump body. Said monitoring means 31 may be formed by a radar detection means. The dotted lines indicate electromagnetic waves radiated from the radar detection means 31. Some material 32 is stuck in the dump body 2.

Figure 3:
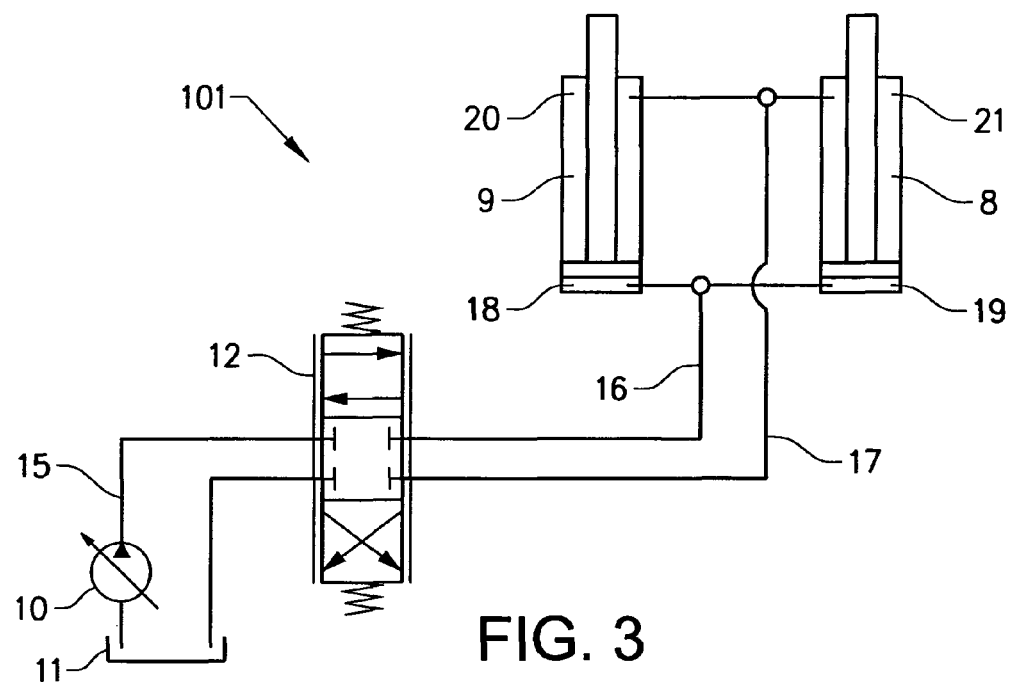
FIG. 3 shows a hydraulic system according to a first embodiment.

FIG. 3 shows a hydraulic system 101 according to a first embodiment for operating the hydraulic cylinders 8,9. The hydraulic system 101 comprises a pump 10 adapted to provide the hydraulic cylinders 8,9 via hydraulic lines 15,16,17 with pressurized hydraulic fluid from a container 11. The tilting cylinders 8,9 are adapted to move in unison during a tilting motion.

A first valve means 12 in the form of a directional valve is arranged on the line 15 between the pump 10 and the hydraulic cylinders 8,9. The directional valve 12 is adapted, in a first position, to direct fluid to the piston sides 18,19 of the cylinders via the line 16 and, in a second position, to direct fluid to the piston rod sides 20,21 via the line 17. When the flow is directed towards the piston sides 18,19 via the line 16, a corresponding flow will run from the piston rod sides 20,21 via the line 17 through the directional valve to the container 11, and vice versa. The directional valve 12 has three positions, wherein an intermediate position blocks any throughflow.

According to an alternative to the above described directional valve, the valve may comprise a four-position directional valve. In addition to the three positions described above, such a directional valve comprises a fourth position, which connects both the piston side and the piston rod side to an atmospheric pressure, such as to the container, wherein a floating state is achieved. Such a floating state is advantageous during transport in that the hydraulic system is relieved.

Figure 4:
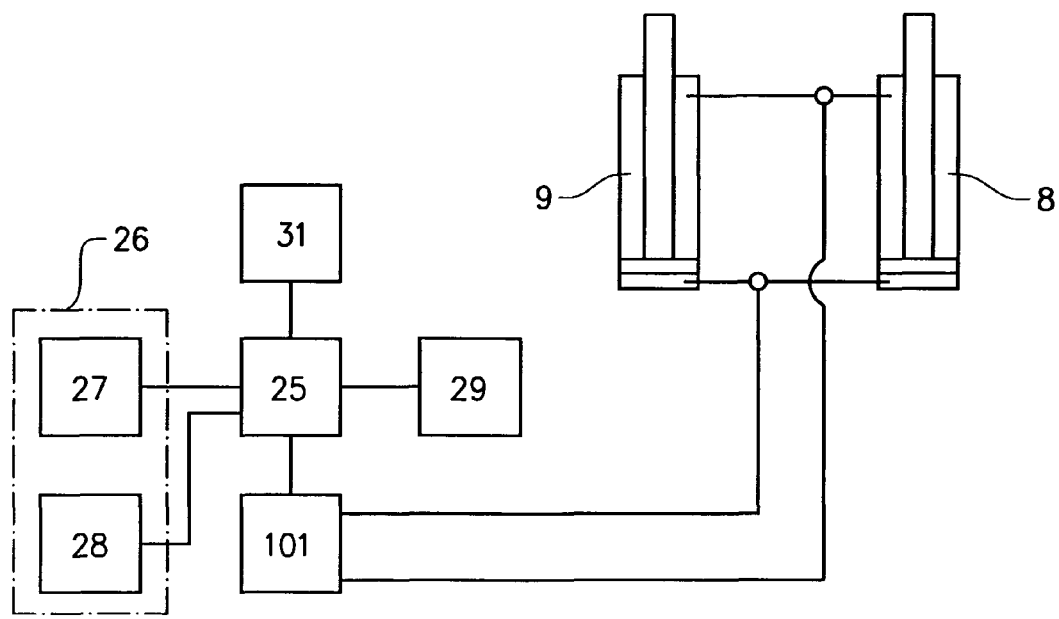
FIG. 4 shows a control system for controlling the tilting procedure.

FIG. 4 shows a control system for controlling the tilting procedure according to an example. The control system comprises a controller 25 or ECU (Electronic Control Unit). The monitoring means 31 is adapted to generate a signal to the controller 25 with information regarding the status (presence of material) of the dump body 2. The controller 25 is adapted to determine whether the tilting motion should be stopped or not on the basis of the status signal. The controller 25 is further adapted to control the hydraulic system 101 in response to said determination. More specifically, the controller 25 controls operation of the valve means 12. A powertrain 26 comprising an engine 27 and transmission 28 is operatively connected to the controller 25. Further, a means 29 for preventing the vehicle from moving is operatively connected to the controller 25.

According to one embodiment, see FIGS. 2-4, the method comprises the step of determining whether there is any— material left in the dump body during a tilting procedure in order to determine if the tilting motion should be stopped. Thus, it is first determined whether there is still material in the dump body 2 when it is in a raised position. The method comprises the step of detecting a load state of the dump body 2 during the elevating motion by means of radar and determining whether the dump body is empty on the basis of the radar detection. The elevating motion is interrupted as soon as it is determined that the dump body 2 is empty. The dump body 2 is thereafter immediately lowered towards its lower extreme position.

Further, according to an alternative embodiment, the method comprises the step of optically detecting a load part of the dump body 2 during the elevating motion and determining whether the dump body is empty on the basis of the detection. Such optical detection may be performed via a camera.

Alternatively, a weight of a material in the dump body 2 is determined during the elevating motion and it is determined whether the dump body 2 is empty on the basis of the determination. A plurality of ways may be used to determine the weight such as using a load cell in a dump body hinge and detecting a pressure in the hydraulic system 101,201.

According to a further development, upon receipt of a start signal (for example generated by an operator controlled element, such as a tilting activation button), the following steps are performed automatically prior to the steps described above:
  Keeping the vehicle standing still by activation of the motion preventing means 29, such as one or several brakes. Preferably, the foundation brake (wheel brakes) is activated. As a complement or alternative, the parking brake is activated.
  Applying a neutral state in the transmission 28. According to a still further development, the following steps are performed automatically after the first steps:
  Controlling the engine 27 to an appropriate operating speed for driving the pump 10 in the hydraulic system 101 in order to elevate the dump body. Elevating the dump body 2 by means of the hydraulic system.

During said elevation of the dump body, the already described monitoring step and stop step are performed. Thus:—Determining when the dump body has reached an empty state during the elevating motion.
  Stopping the elevating motion when it is determined that the dump body has reached the empty state. The elevating motion of the dump body is continuously monitored.
  According to a still further development, the following step is performed automatically after the elevating motion is stopped:
  Lowering the dump body when it is determined that the dump body has reached the empty state.

According to a still further development, one or more of the following steps are performed automatically after the elevating motion is stopped:

Setting the engine to idle.

Engaging a forward gear in the transmission before the dump body reaches the extreme lower position.

Disengaging the brake (s).

Let the hauler start to roll with a predetermined maximum speed immediately when the angle of the dump body is below a predetermined position in the vicinity of the extreme lower position, but not yet in the extreme lower position. The maximum speed limit is only activated until the dump body reaches the extreme lower position. The fact that the machine starts to roll is an indication for the operator that the dumping procedure is finished and that he can drive away.

Thus, all actions necessary to dump the load in the dump body 2 may be performed automatically. Thus, the operator only has to stop the hauler in the correct position and then activate the system.

An operator control means, such as a stick (or lever) or two push buttons, is provided for activation of the method. Moving the stick in a first direction generates a start signal for the method sequence. The sequence is performed as long as the stick is kept in a deflected position. On the other hand, moving the stick in the other direction generates a stop signal, wherein the sequence is interrupted and the dump body is preferably automatically returned to the lower extreme position. According to the two-button alternative, a similar control is achieved in that signals generated by pressing the buttons correspond to signals generated from the stick in the two opposite positions.

Preferably, before the method is possible to activate, it is controlled that the machine is stationary or alternatively moves below a speed limit close to zero.

According to a further alternative, the dump body is automatically vibrated in order to remove stuck material when the dump body is in a raised position. Thus, if the contents in the dump body have not fully been removed from the dump body at a certain tilt angle (for example the upper extreme position), the dump body is vibrated. Preferably, said hydraulic cylinders 8,9 are operated in such a way that vibrations are produced in said dump body. This is preferably accomplished by repeatedly changing supply of hydraulic fluid to the piston side 18,19 and the piston rod side 20,21 of the hydraulic cylinder 8,9. This step may be accomplished by operating the valve means 12 back and forth between its two outermost positions. The dump body is preferably vibrated at a frequency in the interval 20-40 Hz.

According to an alternative, the vibrating motion is produced during a part of or the complete elevating motion of the dump body 2.

According to an alternative to automatically initiating the vibration of the dump body, the vibrations are initiated manually via an operator controlled element if there is still material in the dump body when it has reached its upper extreme position.

Further, according to an alternative to automatically lowering the dump body, the lowering motion is initiated manually via an operator controlled element.

According to a further development, the present position of the dump body and/or the status of the load is indicated to the operator in the cab.

As a safety measure for preventing the hauler to roll over, the turning angle of the machine is monitored, a dump body maximum allowed tilting angle is determined (calculated) on the basis of the current turning angle (and preferably on the basis of load information) and the dump body elevating motion is automatically stopped when it reaches the maximum allowed angle.

In a preferred embodiment, the controller comprises a microprocessor. The controller comprises a memory, which in turn comprises a computer program with computer program segments, or a program code, for implementing the control method when the program is run. This computer program can be transmitted to the controller in various ways via a transmission signal, for example by downloading from another computer, via wire and/or wirelessly, or by installation in a memory circuit. In particular, the transmission signal can be transmitted via the Internet.

The invention is not in any way limited to the above described embodiments, instead a number of alternatives and modifications are possible without departing from the scope of the following claims.

The invention claimed is:

1. A method for controlling a vehicle comprising a dump body, comprising automatically
   monitoring the contents of the dump body during an elevating motion,
   determining when the dump body has reached a predefined condition during the elevating motion, wherein the predetermined condition is defined as an empty state of the dump body, and
   controlling the vehicle by stopping the elevating motion when it is determined that the dump body has reached the predefined condition.

2. A method according to claim 1, wherein the predefined condition is defined as an empty state.

3. A method according to claim 1, comprising the step of stopping the elevating motion when it is determined that the dump body has reached the predefined condition.

4. A method according to claim 1, comprising the step of continuously monitoring the contents of the dump body.

5. A method according to claim 1, comprising the step of automatically lowering the dump body when it is determined that the dump body has reached the predefined condition.

6. A method according to claim 1, comprising the step of monitoring a load receiving part of the dump body during the elevating motion and determining whether the dump body has reached the predefined condition on the basis of the monitoring.

7. A method according to claim 1, comprising the step of optically detecting a load receiving part of the dump body during the elevating motion and determining whether the dump body has reached the predefined condition on the basis of the optical detection.

8. A method according to claim 1, comprising the step of determining a weight of a material in the dump body during the elevating motion and determining whether the dump body has reached the predefined condition on the basis of the weight determination.

9. A method according to claim 8, comprising the step of using a load cell in a dump body hinge for determining the weight.

10. A non-transitory computer readable medium comprising a computer program for implementing the method as claimed in claim 1.

11. A computer having a computer program for implementing the method as claimed in claim 1.

12. A method for controlling a vehicle comprising a dump body, comprising the steps of automatically
    monitoring the contents of the dump body during an elevating motion, determining when the dump body has reached a predefined condition during the elevating motion, and controlling the vehicle when it is determined that the dump body has reached the predefined condition, and monitoring a load receiving part of the dump body during the elevating motion and determining whether the dump body has reached the predefined condition on the basis of the monitoring, the monitoring of the load receiving part of the dump body and determining whether the dump body has reached the predefined condition being performed by radiating the load receiving part of the dump body with electromagnetic waves, receiving an echo signal and determining whether the dump body has reached the predefined condition on the basis of the echo signal.

13. A method according to claim 6, comprising the step of using radar for said monitoring.

14. A method according to claim 6, comprising the step of using a camera for said monitoring.

15. A method for controlling a vehicle comprising a dump body, comprising automatically monitoring the contents of the dump body during an elevating motion, determining when the dump body has reached a predefined condition during the elevating motion, and controlling the vehicle when it is determined that the dump body has reached the predefined condition, and detecting a pressure in a hydraulic system adapted to operate the elevating motion of the dump body and determining whether the dump body has reached the predefined condition on the basis of the pressure detection.

16. A method for controlling a vehicle comprising a dump body, comprising automatically monitoring the contents of the dump body during an elevating motion, determining when the dump body has reached a predefined condition during the elevating motion, and controlling the vehicle when it is determined that the dump body has reached the predefined condition, and detecting a pressure in a hydraulic cylinder adapted to operate the dump body and determining whether the dump body has reached the predefined condition on the basis of the pressure detection.

17. A method according to claim 15, comprising the step of establishing said predefined condition when a certain pressure change is detected.

18. A device for controlling a vehicle comprising a dump body, comprising means for automatically monitoring the contents of the dump body during an elevating motion, and means adapted to determine when the dump body has reached a predefined condition during the elevating motion, the predetermined condition being defined as an empty state of the dump body, and control the vehicle by stopping the elevating motion when it is determined that the dump body has reached the predefined condition.

19. A device according to claim 18, comprising means for stopping the elevating motion when it is determined that the dump body has reached the predefined condition.

20. A device according to claim 18, comprising means for propelling the vehicle when it is determined that the dump body has reached the predefined condition.

* * * * *